(12) United States Patent
Dunn

(10) Patent No.: US 7,066,984 B2
(45) Date of Patent: Jun. 27, 2006

(54) HIGH RECOVERY CARBON MONOXIDE PRODUCTION PROCESS

(75) Inventor: Graeme John Dunn, Guildford (GB)

(73) Assignee: The BOC Group, Inc., Murray Hill, NJ (US)

( * ) Notice: Subject to any disclaimer, the term of this patent is extended or adjusted under 35 U.S.C. 154(b) by 41 days.

(21) Appl. No.: 10/671,404

(22) Filed: Sep. 25, 2003

(65) Prior Publication Data

US 2005/0066813 A1    Mar. 31, 2005

(51) Int. Cl.
*B01D 53/047* (2006.01)
(52) U.S. Cl. ............................ 95/92; 95/96; 423/418.2
(58) Field of Classification Search ................ 95/92, 95/93, 96, 117–119, 138–140, 143, 148; 423/418.2
See application file for complete search history.

(56) References Cited

U.S. PATENT DOCUMENTS

| | | | |
|---|---|---|---|
| 4,048,091 A | 9/1977 | Barnaba | |
| 4,265,868 A * | 5/1981 | Kamody | 423/418.2 |
| 4,316,880 A * | 2/1982 | Jockel et al. | 423/418.2 |
| 4,492,769 A | 1/1985 | Blanchard et al. | |
| 4,522,894 A | 6/1985 | Hwang et al. | |
| 4,537,873 A | 8/1985 | Kato et al. | |
| 4,680,282 A | 7/1987 | Blanchard et al. | |
| 4,726,816 A * | 2/1988 | Fuderer | 95/98 |
| 4,732,577 A * | 3/1988 | Koizumi et al. | 95/101 |
| 4,844,837 A | 7/1989 | Heck et al. | |
| 4,891,950 A * | 1/1990 | Seufert et al. | 62/657 |
| 4,897,253 A | 1/1990 | Jenkins | |
| 4,927,799 A | 5/1990 | Matsumoto et al. | |
| 5,013,705 A | 5/1991 | Koberstein et al. | |
| 5,023,276 A | 6/1991 | Yarrington et al. | |
| 5,073,356 A * | 12/1991 | Guro et al. | 423/418.2 |
| 5,112,590 A * | 5/1992 | Krishnamurthy et al. | 423/418.2 |
| 5,128,003 A * | 7/1992 | Murdoch et al. | 205/628 |
| 5,232,889 A | 8/1993 | Blanchard et al. | |
| 5,368,835 A | 11/1994 | Choudhary et al. | |
| 5,431,855 A | 7/1995 | Green et al. | |
| 5,441,581 A | 8/1995 | Van den Sype et al. | |
| 5,500,149 A | 3/1996 | Green et al. | |
| 5,510,056 A | 4/1996 | Jacobs et al. | |
| 5,580,536 A | 12/1996 | Yao et al. | |
| 5,639,401 A | 6/1997 | Jacobs et al. | |
| 5,648,582 A | 7/1997 | Schmidt et al. | |

(Continued)

FOREIGN PATENT DOCUMENTS

EP    0 303 438 A2    2/1989

(Continued)

OTHER PUBLICATIONS

Sintered Ceria: A New Dense and Fine Grained Ceramic Material by J.F. Baumard, C. Gault and A. Argoitia; Journal of the Less-Common Metals, 127 (1987) 125-130.

(Continued)

*Primary Examiner*—Frank M. Lawrence
(74) *Attorney, Agent, or Firm*—Philip H. Von Neida

(57) ABSTRACT

The present invention provides for a monolith reactor process for the production of syngas from hydrocarbon and oxygen feeds. The syngas is cooled and separated to produce carbon monoxide and hydrogen, and the purification equipment utilized in this separation process recycles tail gas and fuel gas to the syngas feed gas line and recycles methane from the carbon monoxide separation system for feed back to the monolith reactor. This process results in almost complete carbon to carbon monoxide conversion and very high carbon monoxide and hydrogen recoveries.

25 Claims, 1 Drawing Sheet

U.S. PATENT DOCUMENTS

| | | | |
|---|---|---|---|
| 5,658,497 | A | 8/1997 | Kumar et al. |
| 5,785,774 | A | 7/1998 | Van den Sype et al. |
| 5,856,585 | A | 1/1999 | Sanfilippo et al. |
| 5,883,138 | A | 3/1999 | Hershkowitz et al. |
| 5,965,481 | A | 10/1999 | Durand et al. |
| 5,976,721 | A | 11/1999 | Limaye |
| 5,980,857 | A * | 11/1999 | Kapoor et al. ............ 423/648.1 |
| 6,051,162 | A | 4/2000 | Van den Sype et al. |
| 6,254,807 | B1 | 7/2001 | Schmidt et al. |
| 6,322,611 | B1 * | 11/2001 | Engler ........................ 95/55 |
| 6,329,434 | B1 | 12/2001 | Wen et al. |
| 6,455,597 | B1 | 9/2002 | Hohn et al. |
| 6,458,334 | B1 * | 10/2002 | Tamhankar et al. ...... 423/418.2 |
| 6,753,352 | B1 * | 6/2004 | Seiki et al. ................ 518/702 |
| 2001/0041159 | A1 | 11/2001 | Tamhankar et al. |
| 2002/0073845 | A1 * | 6/2002 | Reddy ........................ 95/96 |
| 2002/0107294 | A1 * | 8/2002 | Hufton et al. .............. 518/702 |
| 2003/0007926 | A1 * | 1/2003 | Jiang et al. ................ 423/651 |
| 2003/0047071 | A1 * | 3/2003 | Dolan et al. ................ 95/96 |
| 2004/0255778 | A1 * | 12/2004 | Reddy ........................ 95/96 |

FOREIGN PATENT DOCUMENTS

| | | |
|---|---|---|
| EP | 0317235 A2 * | 5/1989 |
| EP | 0367618 A1 * | 5/1990 |
| EP | 0 524 643 A1 | 1/1993 |
| EP | 0 548 679 A1 | 6/1993 |
| EP | 0 640 561 A1 | 3/1995 |
| EP | 0 781 591 A2 | 7/1997 |
| EP | 1 134 188 A2 | 9/2001 |
| GB | 1399137 | 6/1975 |
| JP | 11-342334 | 12/1999 |
| WO | WO 93/01130 | 1/1993 |
| WO | WO 98/35908 | 8/1998 |
| WO | WO 99/48805 | 9/1999 |

OTHER PUBLICATIONS

"A Comparative Study of Oxygen Storage Capacity over $Ce_{0.6}Zr_{0.4}O_2$ Mixed Oxides Investigated by Temperature-Programmed Reduction and Dynamic OSC Measurements," Hickey et al., Catalysis Letters, vol. 72, No. 102, pp. 45-50 (2001).

"Effect of Ceria Structure on Oxygen Migration for Rh/Ceria Catalysts," by Cordatos et al., J. Phys. Chem., 100, 785-789 (1996).

"Tape Cast Solid Oxide Fuel Cells for the Direct Oxidation of Hydrocarbons," Park et al., Journal of the Electrochemical Society, 148 (5), pp. A443-A447 (2002).

"Catalytic Partial Oxidation of Methane to Synthesis Gas Over $Ni—CeO_2$," Zhu et al., Applied Catalysis A: General 208, pp. 403-417 (2001).

"Catalytic Partial-Oxidation of Methane on a Ceria-Supported Platinum Catalyst for Application in Fuel Cell Electric Vechicles," Pino et al., Applied Catalysis A: General 225, pp. 63-75 (2002).

K. Otsuka, T. Ushiyama and I. Yamanaka, "Partial Oxidation of Methane Using the Redox of Cerium Oxide," Chemistry Letters, pp. 1517-1520, 1993.

E.S. Putna, J. Stubenrauch, J.M. Vohs, and R. J. Gorte, "Ceria-Based Anodes for the Direct Oxidation of Methane in Solid State Oxide Fuel Cells," LANGMUIR, vol. 11, No. 12, 1995, pp. 4832-4837.

* cited by examiner

US 7,066,984 B2

HIGH RECOVERY CARBON MONOXIDE PRODUCTION PROCESS

BACKGROUND OF THE INVENTION

The present invention provides for a monolith reactor process for producing syngas from hydrocarbon and oxygen feeds.

The syngas is cooled and purified to produce pure carbon monoxide and pure hydrogen streams. The purification equipment is designed and operated in a manner to enable the recycle of waste gas streams back to the production process thereby ensuring almost complete carbon to carbon monoxide conversion and very high carbon monoxide and hydrogen gas recoveries.

The conversion of hydrocarbons to hydrogen and carbon monoxide containing gases is well known in the art. Examples of such processes include catalytic steam reforming, autothermal catalytic reforming, catalytic partial oxidation and non-catalytic partial oxidation. Each of these processes has advantages and disadvantages and produce various ratios of hydrogen and carbon monoxide, also known as synthesis gas.

Catalytic partial oxidation is an exothermic reaction wherein a hydrocarbon gas, such as methane, and an oxygen-containing gas, such as air, are contacted with a catalyst at elevated temperatures to produce a reaction product containing high concentrations of hydrogen and carbon monoxide. The catalysts used in these processes are typically noble metals, such as platinum or rhodium, and other transition metals, such as nickel on a suitable support.

Partial oxidation processes convert hydrocarbon containing gases, such as natural gas or naphtha to hydrogen ($H_2$), carbon monoxide (CO) and other trace components such as carbon dioxide ($CO_2$), water ($H_2O$) and other hydrocarbons. The process is typically carried out by injecting preheated hydrocarbons and an oxygen-containing gas into a combustion chamber where oxidation of the hydrocarbons occurs with less than stoichiometric amounts of oxygen for complete combustion. This reaction is conducted at very high temperatures, such as in excess of 700° C. and often in excess of 1,000° C., and pressures up to 150 atmospheres. In some reactions, steam or $CO_2$ can also be injected into the combustion chamber to modify the synthesis gas product and to adjust the ratio of $H_2$ to CO.

More recently, partial oxidation processes have been disclosed in which the hydrocarbon gas is contacted with the oxygen-containing gas at high space velocities in the presence of a catalyst such as a metal deposited on a monolith support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like.

Typically there are two main process cycles for cryogenic carbon monoxide recovery: methane wash cycle and partial condensation cycle. The first generally achieves higher carbon monoxide recovery and better hydrogen purities but can be more power and capital intensive. The second is less power and capital intensive but achieves lower hydrogen purities and carbon monoxide recoveries. The present invention recognizes this problem and is able to achieve both higher carbon monoxide recovery and hydrogen purity without a commensurate increase in power consumption or capital expenditures.

SUMMARY OF THE INVENTION

The present invention provides for an improved process for producing carbon monoxide from a monolith reactor. The process comprises the steps of feeding the synthesis gas from the monolith reactor consisting of carbon monoxide, carbon dioxide, methane and hydrogen to a carbon dioxide separation system. The carbon dioxide separation system contains a compressor to raise the pressure of the synthesis gas into the carbon dioxide separation system, thereby separating carbon dioxide from the feed gas stream. The syngas stream is then fed to a pre-purification unit (PPU) (to remove trace CO2 and water) before being fed to a carbon monoxide removal system, in this case a cold box, to separate the remaining components of carbon monoxide, methane and hydrogen.

The typical syngas produced by the monolith reactor has a methane content of approximately 1%. As a result, a partial condensation cycle is employed to minimize the costs in terms of power and capital of the carbon monoxide cold box.

The cold box consist of a number of steps: a raw $H_2$ stream is removed by partially condensing the feed stream, the residual $H_2$ is then removed from the condensed feed to a fuel gas stream, and finally the remaining carbon monoxide and methane are separated to provide a pure carbon monoxide product stream and a methane stream.

The raw hydrogen from the cold box is purified in a pressure swing adsorption (PSA) unit to provide a pure hydrogen product stream and a tail gas stream.

However, one limitation of the partial condensation cycle is that it achieves lower carbon monoxide recoveries and hydrogen purities than a methane wash cold box cycle. The typical approach to improving the carbon monoxide recoveries and hydrogen purities from a partial condensation cycle is to increase the complexity of the cold box cycle, leading to additional capital and power consumption. The present invention overcomes this limitation by recycling streams where carbon monoxide is lost, namely the tail gas from the pressure swing adsorption cycle and the fuel gas stream overhead from the carbon monoxide cold box back to the feed stream prior to the carbon dioxide separation process and prior to the compressor used to compress the syngas for introduction into the carbon dioxide separation process. This is naturally at a low pressure so the two streams can be recycled without any additional equipment and allows for a low cost cold box cycle to be employed. Although this gives a relatively low carbon monoxide recovery from the cold box, the overall process achieves a very high carbon monoxide recovery as well as increasing the overall hydrogen recovery to a high level.

The improvement comprises recycling the tail gas comprising $H_2$ and CO from the PSA hydrogen separation system and the fuel gas also comprising $H_2$ and CO from the carbon monoxide removal system to the compressor of the carbon dioxide removal system.

The other waste stream from the cold box is the methane from the carbon monoxide-methane separation column. This methane stream can be recycled back to the feed to the reactor thereby raising the overall conversion of the hydrocarbon in the feed from approximately 97% in the reactor to almost 100% for the system as a whole. When carbon dioxide is recycled back to the reactor, there is virtually no carbon loss from the system and the overall carbon in the hydrocarbon feed to carbon monoxide conversion approaches 100%. Additional benefits include no $CO_2$ emissions from the process and no other waste gas streams which need to either be disposed of and/or purified prior to their disposal.

Alternatively, the process of the present invention can be practiced by either recycling the tail gas from the hydrogen separation system to the compressor in the carbon dioxide separation system or the fuel gas from the carbon monoxide separation system to the compressor in the carbon dioxide separation system.

BRIEF DESCRIPTION OF THE DRAWINGS

The drawing is a schematic diagram of a monolith reactor based carbon monoxide production plant.

DETAILED DESCRIPTION OF THE INVENTION

Figure 1:
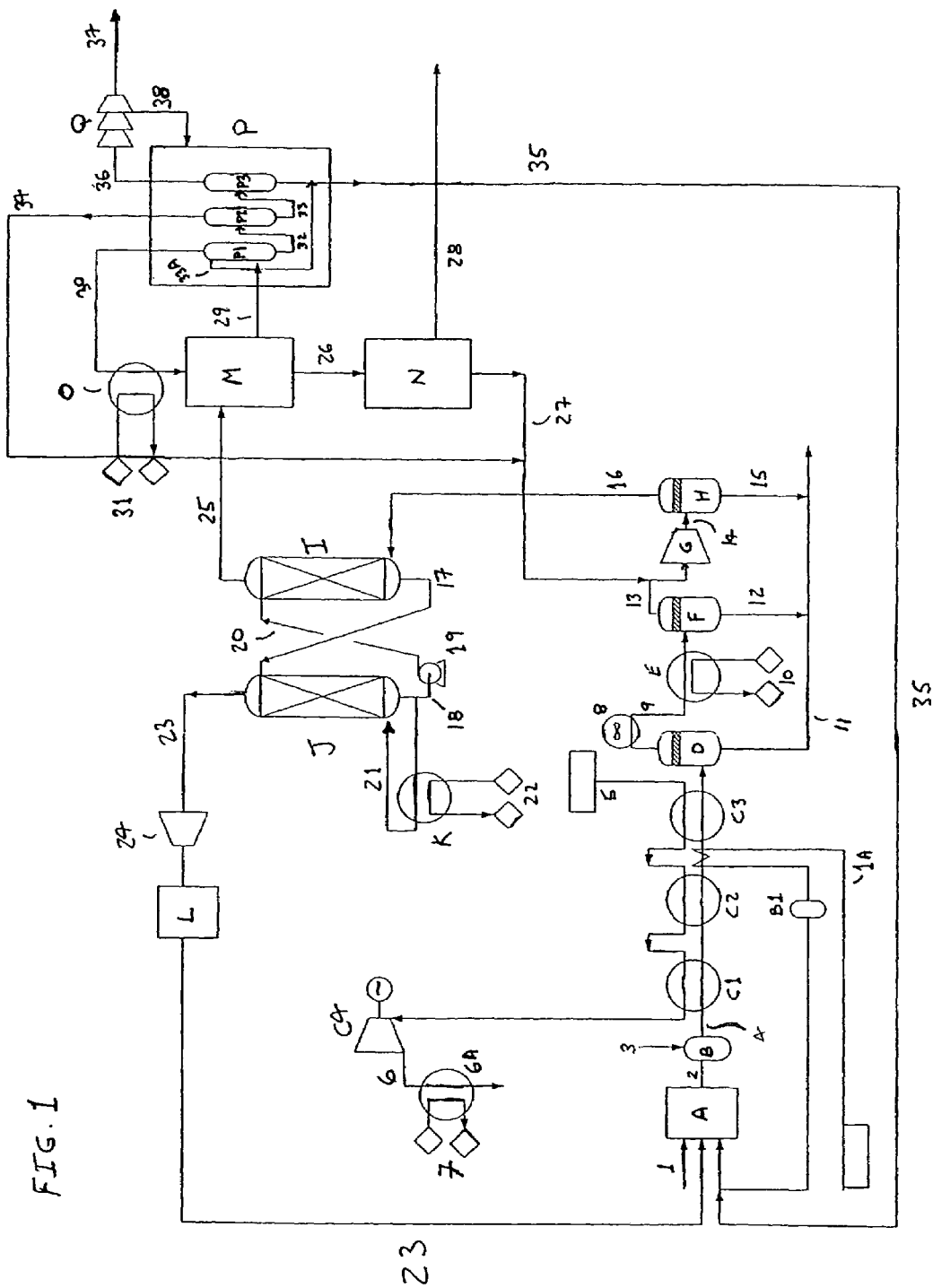

Reference will now be made to the figure where there is shown an embodiment which describes the basic operation of the present invention. Oxygen is fed through line 1 to the monolith reactor A. The monolith reactor comprises a metal catalyst consisting essentially of a metal supported by a ceria coating disposed on a ceramic monolith. The metal is selected from the group consisting of nickel, cobalt, iron, platinum, palladium, iridium, rhenium, ruthenium, rhodium and osmium. The ceramic material is selected from the group consisting of zirconia, alumina, yttria, titania, magnesia, ceria and cordierite. Ceria coating has a weight % between about 5% and about 30% with respect to the ceramic monolith. In one embodiment, the ceramic is selected from the group consisting of zirconia, yttria, titania, magnesia, ceria and cordierite. A further description of this metal catalyst monolith ceramic may be found in co-pending application Ser. No. 10/143,705 published on Jan. 9, 2003, as US 2003/0007926A1 to Jiang et al.

Natural gas is also fed to reactor A through line 1A after passing through de-sulfurization unit B1. The feed pressures for the oxygen and natural gas are typically low pressures of about 1 bar(g). Line 23 also feeds into reactor A and provides a supply of carbon dioxide. The feed product gas which comprises carbon monoxide, carbon dioxide, methane and hydrogen, as well as nitrogen, argon and water, leaves the reactor A through line 2 to a quench B supplied with quench water through line 3. After being quenched from about 1025° C. to about 800° C., this feed gas travels through line 4 to a steam super heater C1, a waste heat boiler C2 and a boiler feed water exchanger C3 to container D. Boiler feed water is supplied through line 5 and is condensed in a condensing steam turbine C4 whereby condensate exits the condensing steam turbine through line 6. Line 7 provides the cold water recycle to the condensing unit 6A.

Condensate will also leave container D through line 11 where the condensate can be recovered. The feed gas stream travels through line 9 through an air cooler 8 to the water cooler E which utilizes cold water recycle through line 10. Temperatures of the feed gas stream are now about ambient. The feed gas travels through line 9 to container F whereby further condensate is discharged through line 12 to line 11 and the overhead feed gas exits through line 13 to the syngas compressor G where the syngas is compressed to about 10 to about 50 bar(g). The compressed syngas feed stream travels through line 14 to container H where further condensate is discharged through line 15 to line 11. The overhead feed gas stream having been compressed travels through line 16 to the carbon dioxide removal column I which operates at 10 to about 30 bar(g).

The bottoms of the column I exit through line 17 to be fed to the overhead of column J and the reboiler bottoms of column J exit through line 18 to pump 19 where they are fed through line 20 to the tops of $CO_2$ removal column I. Line 21 runs from line 18 to the reboiler unit K and back to the bottoms of the column J. Line 22 provides low pressure steam to the reboiler K. Carbon dioxide which is approximately 2 to 3% of the content of the feed gas stream is vented and exits through line 23 to a compressor unit 24 on through a dryer unit L where it will ultimately return to the feed of the monolith reactor A. Line 25 feeds carbon monoxide, methane and hydrogen to the pre-purification unit M which will remove water, trace carbon dioxide, and other extraneous gases from the carbon monoxide, methane and hydrogen mixture. These will exit through 29 to feed the carbon monoxide cold box assembly P.

Carbon monoxide as part of the separated gas from the PPU travels through line 29, is cooled as part of the cold box process and goes to separator vessel P1. The overhead from separator vessel P1, a raw $H_2$ stream of approximately 90% $H_2$ and 10% CO exits through line 30 to a regeneration heater unit O which is supplied by a low pressure steam line 31 and this raw hydrogen will re-enter the PPU assembly M, to provide a regeneration flow to the adsorbent.

Line 26 exits the pre-purification unit M, carries the predominantly hydrogen containing regeneration gas (about 90%) to a hydrogen pressure swing adsorption (PSA) unit N. Line 27 which comprises the PSA tail gas, which is approximately 2:1 ratio of hydrogen to carbon monoxide returns to line 13 to provide the separated carbon monoxide back into the compressor G. The hydrogen product will exit the hydrogen PSA unit N through line 28 where it may be supplied to end users.

The PSA unit may be a one-state process of purification which will remove impurity gases such as carbon monoxide, nitrogen, hydrocarbons, carbon dioxide and water vapor from a gas mixture. Higher purities can be obtained using a two stage PSA process whereby any carbon dioxide, water vapor and hydrocarbons can be removed by adsorption using activated carbon and then using a zeolite layer to remove any carbon monoxide, nitrogen and residual hydrocarbons. Conventional zeolite adsorbents that can be employed include type A zeolites and faujasite zeolites having the formula $SiO_2/Al_2O_3$ in a molar ratio of about 2.5 to 1.

The bottoms from column P1 exits through line 32 to column P2 and the tops from column P2 exits through line 34. These tops comprise a fuel gas which is approximately 2:1 ratio of hydrogen to carbon monoxide which is directed to line 27 which will ultimately bring it to line 13 for entry into the compressor assembly G. The bottoms from column P2 are directed through line 33 to column P3 where carbon monoxide will exit through the tops through line 36 to a carbon monoxide compressor unit Q from which carbon monoxide product is directed through line 37 to its end user. Line 38 recycles some of the carbon monoxide gas back into the cold box to provide heat pumping duties. The tops of column P1 may also exit by line 33A and enter line 35. Methane from the bottoms of column P3 exits through line 35 where it is recycled to the monolith reactor A thereby assisting in achieving a greater conversion of the hydrocarbon in the feed.

While this invention has been described with respect to particular embodiments thereof, it is apparent that numerous other forms and modifications of the invention will be obvious to those skilled in the art. The appending claims in this invention generally should be construed to cover all

Having thus described the invention, what I claim is:

1. An improved process for producing carbon monoxide from a monolith reactor comprising the steps:
   a) feeding a feed gas comprising carbon monoxide, carbon dioxide, methane and hydrogen to a carbon dioxide separation system having at least one compressor;
   b) feeding said feed gas from said carbon dioxide separation system to a carbon monoxide separation system;
   c) feeding a hydrogen stream from said carbon monoxide separation system to a hydrogen separation system;
   d) the improvement comprising recycling tail gas from said hydrogen separation system and fuel gas from said carbon monoxide separation system to said compressor in said carbon dioxide separation system.

2. The process as claimed in claim 1 further comprising recycling a methane stream from said carbon monoxide separation system to said monolith reactor.

3. The process as claimed in claim 1 wherein said hydrogen separation system is a pressure swing adsorption system.

4. The process as claimed in claim 1 wherein said carbon monoxide separation system comprises a cold box containing a separator vessel, stripper column and carbon monoxide/methane splitter column.

5. The process as claimed in claim 1 wherein said monolith reactor comprises a metal catalyst consisting essentially of a metal supported by a ceria coating disposed on a ceramic monolith wherein said metal is selected from the group consisting of nickel, cobalt, iron, platinum, palladium, iridium, rhenium, ruthenium, rhodium and osmium said ceramic is selected from the group consisting of zirconia, alumina, yttria, titania, magnesia, ceria and cordierite and said ceria coating has a weight % between about 5% and about 30% with respect to said monolith.

6. The process as claimed in claim 1 further comprising producing high purity hydrogen from said monolith reactor.

7. The process as claimed in claim 1 wherein said tail gas comprises about 2:1 by volume of hydrogen to carbon monoxide.

8. The process as claimed in claim 1 wherein said fuel gas comprises about 2:1 by volume of hydrogen to carbon monoxide.

9. The process as claimed in claim 1 wherein said compressor compresses said feed gas to about 10 to about 50 bar(g).

10. The process as claimed in claim 1 wherein carbon dioxide is removed from said feed gas in step (a).

11. The process as claimed in claim 1 wherein carbon monoxide is removed from said feed gas in step (b).

12. The process as claimed in claim 1 wherein hydrogen is removed from said feed gas stream as a raw $H_2$ stream in step (b) and further purified in step (c).

13. An improved process for producing carbon monoxide from a monolith reactor comprising the steps:
   a) feeding a feed gas comprising carbon monoxide, carbon dioxide, methane and hydrogen to a carbon dioxide separation system having at least one compressor;
   b) feeding said feed gas from said carbon dioxide separation system to a carbon monoxide separation system;
   c) feeding a hydrogen stream from said carbon monoxide separation system to a hydrogen separation system;
   d) the improvement comprising recycling tail gas from said hydrogen separation system to said compressor in said carbon dioxide separation system.

14. The process as claimed in claim 13 wherein said improvement further comprises recycling a fuel gas from said carbon monoxide separation system to said compressor in said carbon dioxide separation system.

15. The process as claimed in claim 13 further comprising recycling methane from said carbon monoxide separation system to said monolith reactor.

16. The process as claimed in claim 13 wherein said hydrogen separation system is a pressure swing adsorption system.

17. The process as claimed in claim 13 wherein said carbon monoxide separation system comprises a cold box containing a separator vessel, stripper column and carbon monoxide/methane splitter column.

18. The process as claimed in claim 13 wherein said monolith reactor comprises a metal catalyst consisting essentially of a metal supported by a ceria coating disposed on a ceramic monolith wherein said metal is selected from the group consisting of nickel, cobalt, iron, platinum, palladium, iridium, rhenium, ruthenium, rhodium and osmium said ceramic is selected from the group consisting of zirconia, alumina, yttria, titania, magnesia, ceria and cordierite and said ceria coating has a weight % between about 5% and about 30% with respect to said monolith.

19. The process as claimed in claim 13 further comprising producing high purity hydrogen from said monolith reactor.

20. The process as claimed in claim 13 wherein said tail gas comprises about 2:1 by volume of hydrogen to carbon monoxide.

21. The process as claimed in claim 14 wherein said fuel gas comprises about 2:1 by volume of hydrogen to carbon monoxide.

22. The process as claimed in claim 13 wherein said compressor compresses said feed gas to about 10 to about 50 bar(g).

23. The process as claimed in claim 13 wherein carbon dioxide is removed from said feed gas in step (a).

24. The process as claimed in claim 13 wherein carbon monoxide is removed from said feed gas in step (b).

25. The process as claimed in claim 13 wherein hydrogen is removed from said feed gas as a raw $H_2$ stream in step (b) and further purified in step (c).

* * * * *